VALENTINE & RIDOUT.
Feeding Attachment for Thrashing Machines.
No. 49,044. Patented July 25, 1865.
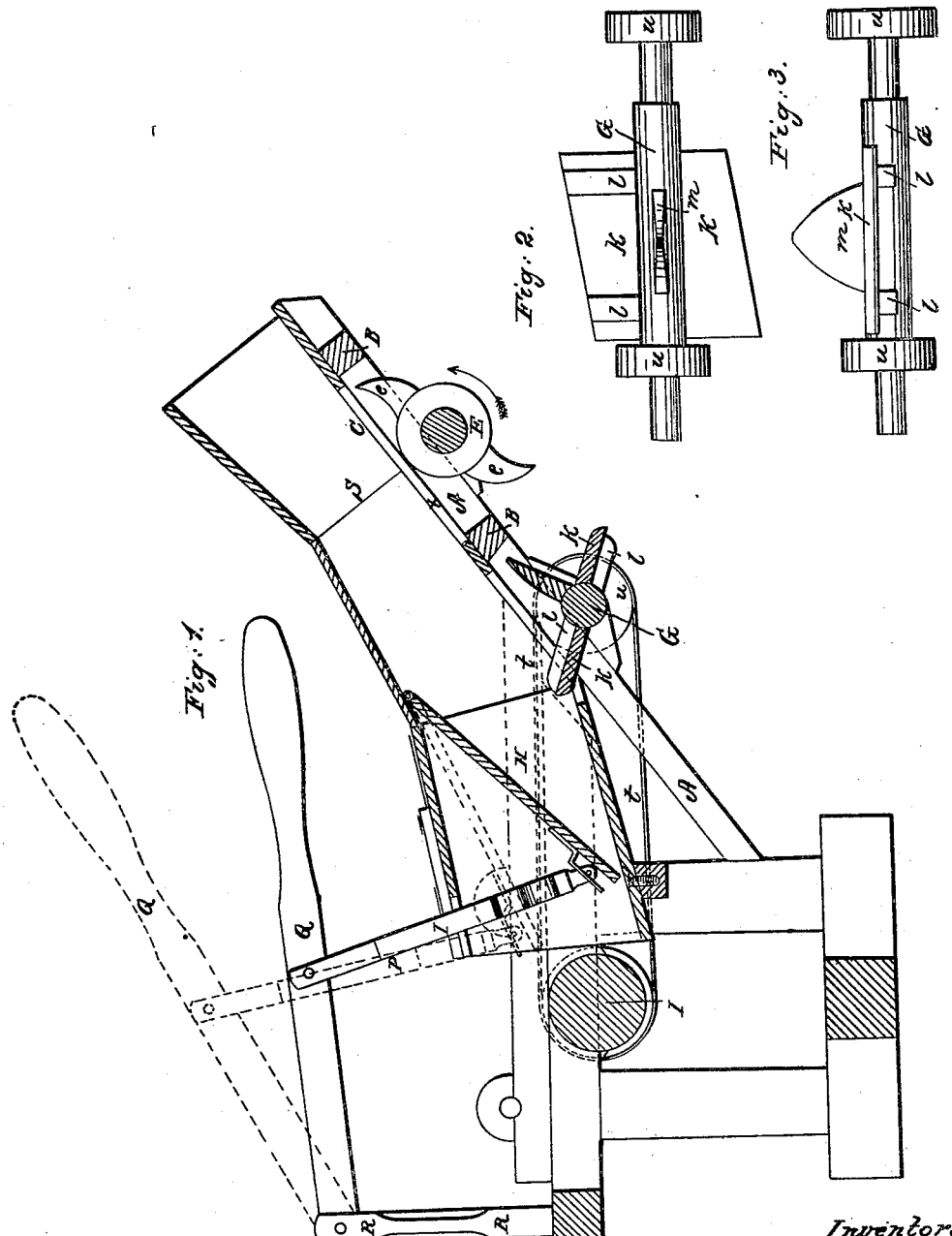
Witnesses:
Gilbert B Fowler
Frederick B. Hoffman.
Inventors:
Elijah Valentine
Moses S. Ridout.
By David A Burr.
Attorney.

United States Patent Office.

ELIJAH VALENTINE AND MOSES T. RIDOUT, OF MILWAUKEE, WISCONSIN, ASSIGNORS TO THEMSELVES AND WM. BECK, OF SAME PLACE.

IMPROVEMENT IN APPARATUS FOR FEEDING THRASHING-MACHINES.

Specification forming part of Letters Patent No. 49,044, dated July 25, 1865.

*To all whom it may concern:*

Be it known that we, ELIJAH VALENTINE and MOSES T. RIDOUT, both of the city and county of Milwaukee, in the State of Wisconsin, have invented a new and useful Feeding Attachment to Thrashing-Machines; and we do hereby declare that the following is a full, clear, and exact description thereof, reference being had to the accompanying drawings, forming a part of this specification, in which—

Figure 1 represents a vertical longitudinal section through the center of the machine, and Figs. 2 and 3 detached views of the spreading-shaft and beaters.

The object of our invention is to feed sheaves of grain to any description of thrashing-machines by mechanism which shall cut the band of each sheaf and feed and deliver the grain-stalks evenly to the thrasher.

Our machine is constructed of an inclined frame, A, to be attached to the tail end of a thrashing-machine at an elevation of from thirty to forty degrees, and which is strengthened by the cross-beams B B. Upon this frame is placed a feeding-hopper, S, having a flat bottom, C, but whose sides and top first incline inwardly, so that it contracts in its dimensions to a size sufficient only to allow free passage for a sheaf of grain, and then outwardly until it has attained about the proportion of the cylinder-opening of the thrashing-machine.

A horizontal shaft, D, is supported in bearings under the side beams of the frame A, so as to revolve immediately beneath the narrowest point of the hopper S, as seen in Fig. 1. Upon the center of this shaft D is secured a circular plate, E, having at opposite points of its circumference two projecting knives or blades, $e$ $e$, which are each slightly curved in the same direction, the inner extremity of these curves being formed into sharp cutting-edges. These cutting-blades $e$ $e$ are made long enough to project up into the hopper S through a longitudinal slot, $x$, cut centrally in its bottom C, so as to reach and cut the band of each sheaf passing through the narrow throat of the hopper S. From this narrow point, at which the bands are cut by the revolving blades $e$ $e$, the sides and top of the hopper S incline outwardly again to a dimension equal to that of the receiving-aperture of the thrashing-machine to which it is attached.

The inclined bottom C of the hopper S is cut away just below the slot $x$, through which the cutting-blades $e$ $e$ work, so as to allow the revolving spreaders or beaters upon the horizontal shaft G to act upon the straw of the sheaf left loose by the cutting of its band. The shaft G, like the shaft D, is supported in bearings under the side pieces of the frame A. Two lifting and spreading boards, $k$ $k$, are placed upon this shaft and are secured, like paddles, upon arms $l$ $l$, projecting radially from opposite points thereof parallel to its axis. These spreading boards or paddles $k$ $k$ are made wider at one end than at the other, the wide end of the first being opposite to the narrow extremity of the second, as seen in Fig. 2 of the drawings, so that the grain is thrown to one side by one board and in the opposite direction by that which follows. A third spreading device or bumper, M, tapering to a point, as seen in Fig. 3 of the drawings, is secured directly to the shaft G midway between the paddles. This bumper M serves to separate and spread to the sides the grain remaining bundled and crowded in the center of the hopper. In front of the spreading-wheel is placed a delivery-box, H, of equal and uniform size throughout, and through which the spread grain-stalks are forced onto the cylinder I of the thrashing-machine by the action of the spreading-wheel.

In order to regulate the delivery of the grain to the thrasher and prevent clogging, a pressure-board, O, is hinged to the top front edge of the hopper, so as to project forward into the delivery-box H, with which it corresponds nearly in width. The free end of this pressure-board O is connected by means of a link, P, with the horizontal lever Q, pivoted to the standard R, and extending back over the delivery-box H, as seen in Fig. 1, so that by its elevation or depression the pressure-board O may be likewise raised or lowered in the said box. The pressure-board is secured at any desired elevation by means of a suitable spring-catch engaging with notches in the sides of the link P.

Motion is imparted to the shafts D and G from the cylinder I by means of bands $t$ passing over pulleys $u$ on the ends of each, as partially shown in Fig. 1.

The operation of our feeding attachment is as follows: A sheaf of wheat or other grain as it comes from the field-bound in the usual manner, is pitched into the mouth of the hopper S with the ears of grain foremost, and immediately slides down by its own gravity over the slot $x$. Here the knife-blades $e\,e$, revolving forward, as indicated by the arrow in Fig. 1, sweeping upward and forward into the hopper S, will catch and cut the band confining the grain in the sheaf. So soon as the band has been cut the bundle of straw will be struck by the bumper M, which, coming in contact with the center of the bundle near the heads of grain, will lift the stalks forward, at the same time parting them and throwing them from the center toward the side of the box. The paddles $k\,k$, immediately following the pointed spreader $m$, strike the stalks at their centers and butts successively and spread them uniformly and evenly over the bottom of the delivery-box H, at the same time lifting and throwing them forward upon the cylinder I of the thrashing-machine. The pressure-board O is in the meantime elevated, as indicated by the red lines in Fig. 1, so far as to allow the passage of the grain; but if the thrasher choke and clog, the feed is checked instantly by shutting down the pressure-board, as indicated in the drawings, so as to prevent a further delivery until the machine has cleared itself.

Although we prefer to make and arrange the spreaders in the forms herein described, other forms may be used with good effect, and we do not limit ourselves to any particular configuration thereof.

We are aware that machines have heretofore been constructed for cutting the sheaf-bands and spreading the stalks of grain in thrashing-machines, but in all such which have come to our knowledge the cutting-blades and spreaders have been arranged upon the same shaft, so that the butts, instead of the heads, of the grain-stalks were alone spread out; but, Having fully described our own improvement, we claim as new and desire to secure by Letters Patent—

Combining with each other and with a hopper, S, and feeding-box H, attached to a thrashing-machine, suitable revolving knives, $e\,e$, for cutting the bands confining sheaves of grain, and revolving beaters or paddles $k\,k$ and $m$, to lift and spread out the same when said knives and beaters are secured to and operate upon separate shafts, substantially in the manner herein set forth.

The foregoing specification of our improved feeding attachment for grain thrashers signed by us this 20th day of May, A. D. 1865.

ELIJAH VALENTINE.
    MOSES T. RIDOUT.

In presence of—
 WM. BECK,
 L. MERRICK.